(12) United States Patent
Wood et al.

(10) Patent No.: US 9,524,349 B2
(45) Date of Patent: *Dec. 20, 2016

(54) IDENTIFYING PARTICULAR IMAGES FROM A COLLECTION

(71) Applicant: Kodak Alaris Inc., Rochester, NY (US)

(72) Inventors: Mark D. Wood, Penfield, NY (US); Alexander C. Loui, Penfield, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,265

(22) Filed: Apr. 20, 2015

(65) Prior Publication Data

US 2015/0227634 A1    Aug. 13, 2015

Related U.S. Application Data

(63) Continuation of application No. 14/079,787, filed on Nov. 14, 2013, now Pat. No. 9,037,569, which is a continuation of application No. 13/021,188, filed on Feb. 4, 2011, now Pat. No. 8,612,441.

(51) Int. Cl.
*G06F 17/30* (2006.01)

(52) U.S. Cl.
CPC ..... *G06F 17/30867* (2013.01); *G06F 17/3074* (2013.01); *G06F 17/30244* (2013.01); *G06F 17/30247* (2013.01); *G06F 17/30268* (2013.01); *G06F 17/30525* (2013.01); *G06F 17/30781* (2013.01); *G06F 17/30997* (2013.01)

(58) Field of Classification Search
CPC ............... G06F 17/30011; G06F 17/30017
See application file for complete search history.

(56) References Cited

U.S. PATENT DOCUMENTS

| 7,958,063 B2* | 6/2011 | Long | G06K 9/00147 706/12 |
|---|---|---|---|
| 2004/0143598 A1* | 7/2004 | Drucker | G06F 17/30011 |
| 2004/0205116 A1* | 10/2004 | Pulier | G06F 17/30017 709/203 |
| 2006/0161867 A1* | 7/2006 | Drucker | G06F 17/30011 715/810 |
| 2009/0094518 A1* | 4/2009 | Lawther | G06F 3/04817 715/716 |

(Continued)

*Primary Examiner* — Angelica Ruiz
(74) *Attorney, Agent, or Firm* — Hogan Lovells US LLP (57) ABSTRACT

A method of identifying one or more particular images from an image collection, includes indexing the image collection to provide image descriptors for each image in the image collection such that each image is described by one or more of the image descriptors; receiving a query from a user specifying at least one keyword for an image search; and using the keyword(s) to search a second collection of tagged images to identify co-occurrence keywords. The method further includes using the identified co-occurrence keywords to provide an expanded list of keywords; using the expanded list of keywords to search the image descriptors to identify a set of candidate images satisfying the keywords; grouping the set of candidate images according to at least one of the image descriptors, and selecting one or more representative images from each grouping; and displaying the representative images to the user.

15 Claims, 7 Drawing Sheets

(56) References Cited

U.S. PATENT DOCUMENTS

| | | | |
|---|---|---|---|
| 2009/0161962 A1* | 6/2009 | Gallagher | G06F 17/30247 382/203 |
| 2011/0055044 A1* | 3/2011 | Wiedl | G06Q 30/02 705/26.5 |
| 2011/0093802 A1* | 4/2011 | Gaucas | G06F 17/30525 715/764 |
| 2011/0137910 A1* | 6/2011 | Hibino | G06F 17/30247 707/741 |

* cited by examiner

FIG. 7

IDENTIFYING PARTICULAR IMAGES FROM A COLLECTION

INCORPORATE BY REFERENCE

This application is a continuation of U.S. application Ser. No. 14/079,787, filed on Nov. 14, 2013, which is a continuation of U.S. application Ser. No. 13/021,188, filed on Feb. 4, 2011, and now U.S. Pat. No. 8,612,441, issued on Dec. 17, 2013, which is hereby incorporated by reference in its entirety.

FIELD OF THE INVENTION

The present invention relates to identifying one or more particular images from an image collection.

BACKGROUND OF THE INVENTION

Personal image collections can easily include thousands or tens of thousands of images. As image collections grow, retrieving individual images becomes increasingly difficult. Various image retrieval systems have been deployed in order to address this problem. A familiar paradigm for searching documents is one where the user provides a set of search terms and the system returns a list of documents satisfying those search terms, ranked in order of how well each document satisfies the specified search terms. This paradigm has been applied to searching for images in applications such as Google Image Search and Flickr, as well as in a variety of desktop applications. A limitation of such systems is that each image must somehow be annotated with terms that might be used as search terms in order for searches to return any results. It is very time consuming to manually apply such annotations, although some systems automatically annotate images using a limited number of concepts. Moreover, users can only search using search terms that match the terms used in the annotations; such vocabularies tend to be very limited and constrained. Work in the area of information retrieval and specifically query processing has considered the problem of query expansion, but it is difficult to expand queries using terms appropriate for the consumer imaging domain. Such systems tend to either return too few results to be useful, or too many results for the user to effectively consider.

SUMMARY OF THE INVENTION

The above-described problems are addressed and a technical solution is achieved by a method of identifying one or more particular images from an image collection, comprising using a data processing system for:

(a) indexing the image collection to provide image descriptors for each image in the image collection such that each image is described by one or more of the image descriptors;

(b) receiving a query from a user specifying at least one keyword for an image search;

(c) using the keyword(s) to search a second collection of tagged images to identify co-occurrence keywords;

(d) using the identified co-occurrence keywords to provide an expanded list of keywords;

(e) using the expanded list of keywords to search the image descriptors to identify a set of candidate images satisfying the keywords;

(f) grouping the set of candidate images according to at least one of the image descriptors, and selecting one or more representative images from each grouping; and (g) displaying the representative images to the user.

An advantage of the present invention is that it enables users to search their personal image collections using arbitrarily complex and potentially obscure search terms, without requiring the user to provide annotations for the images and without requiring the system to incorporate indexers for recognizing the corresponding concepts. The present invention enables semantically complex concepts to be automatically associated with images for which only low-level semantic concepts are available. The present invention further improves the user's ability to interpret, navigate and view search results.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the present invention.

DETAILED DESCRIPTION OF THE INVENTION

Searching for images in personal image collections is becoming increasingly difficult, especially as image collections grow to include thousands or tens of thousands of images. A user can have in mind some concepts, and wish to retrieve images associated with that concept. Or an individual can recall a specific event, scene or object and wish to retrieve any corresponding pictures they might have. However, unless the user has manually annotated the images in their collection according to some concept ontology, they typically are unable to search based on those concepts.

Researchers have developed a limited number of algorithms for automatically labeling images with specific concepts from a limited vocabulary, using trained concept detectors. Once such algorithms have been used to label images, the images can then be searched using search terms from the corresponding concept vocabulary. However, the concept vocabulary is typically very small and often generic in meaning, limiting the expressiveness of searches. People using such systems must be familiar with the limited vocabulary in order to write searches. Often too many images will match a generic concept, limiting the effectiveness of the search. If the user wishes to search on a term not included in the vocabulary, the search will fail. Some researchers have investigated ways to take a prescribed set of concepts that form a query, and expand them using some sort of concept expansion algorithm. Concept expansion algorithms that are specific to the query domain are most effective.

The present invention combines automatic labeling with domain-specific concept expansion to enable image retrieval from unannotated or minimally annotated image collections. This approach can permit a user to search collections using queries containing semantically complex concepts or keywords. Using this approach, a user can search their personal image collection for pictures of manatees, for example, and get appropriate results, even though none of the pictures were tagged as containing manatees nor does the system include an algorithm for identifying manatees. Instead, the system relies on combining low level or common concepts for which there are automated algorithms (although the user is also free to add such tags if desired). Continuing the example, algorithms for identifying water are relatively robust, and can be combined with information obtained from reverse geocoding latitude and longitude information which is increasingly recorded as part of the image capture process. Such information can be applied to a picture of an object taken in a river in a Florida wildlife state park, permitting the system to conclude that this image is more likely to contain manatees than other images in the user's collection. As another example, it can be difficult to automatically associate the term "piano recital" with a given video clip taken at a child's first piano recital. However, identifying that the associated audio track contains instrumental music and combining that with knowledge that the video was captured at a music school in the evening can again permit the system to conclude that the given video is more likely than other videos to be a video of a piano recital.

Although this approach alone will often provide satisfactory results, in some cases it will return results that do not satisfy the search criteria directly, but are nevertheless related in some way to the correct results. A feature of the present invention is that the returned results can be grouped according to logical groupings such as events or visual similarity, and presented according to such groupings. Such groups permit the representation of the results to be condensed, enabling the user to quickly identify any groupings that might contain the desired results. A grouping can be visually represented by picking a representative image from the set, such as a mini collage of a subset of the images, or by some other appropriate representation. The user can then readily expand the selected groupings to reveal the specific intended target, if the intended target was not itself originally displayed as one of the search results. The present invention enables successful concept-based image retrieval on large personal image collections, even in the absence of user-provided annotations.

Although the present invention is written specific to retrieving image objects from an image collection, the concept described here is not limited to images. For example, the present invention can be applied to search for music, video or document files.

Figure 1:
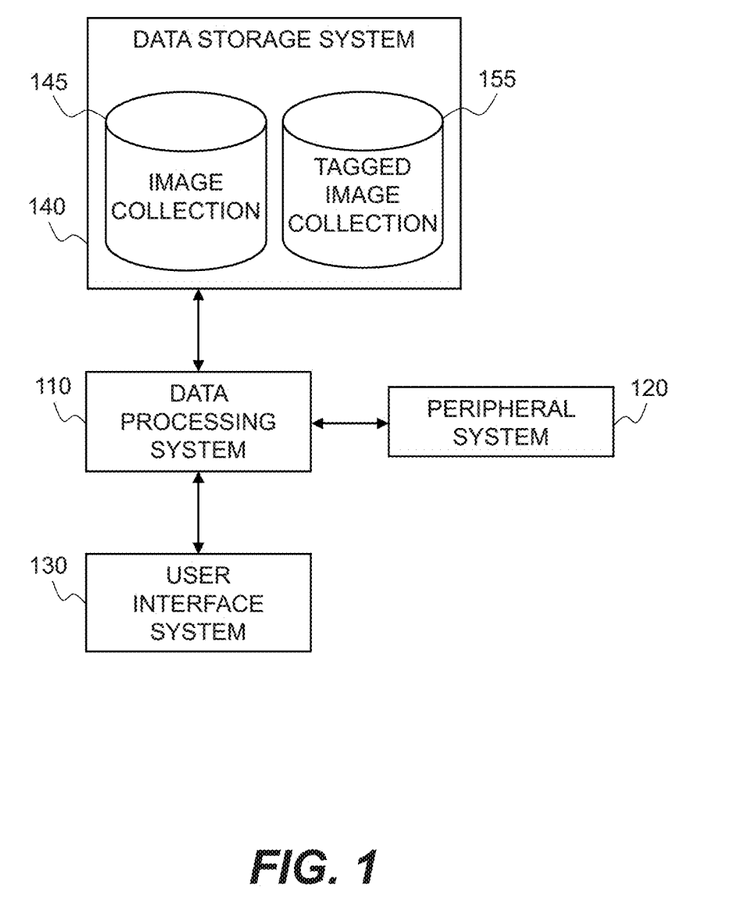
FIG. 1 is a high-level diagram showing the components of a system for receiving and processing image queries according to an embodiment of the present invention.

FIG. 1 illustrates a system 100 for identifying one or more particular images from an image collection, according to an embodiment of the present invention. The system 100 includes a data processing system 110, a peripheral system 120, a user interface system 130, and a processor-accessible data storage system 140. The processor-accessible data storage system 140, the peripheral system 120, and the user interface system 130 are communicatively connected to the data processing system 110.

Figure 2:
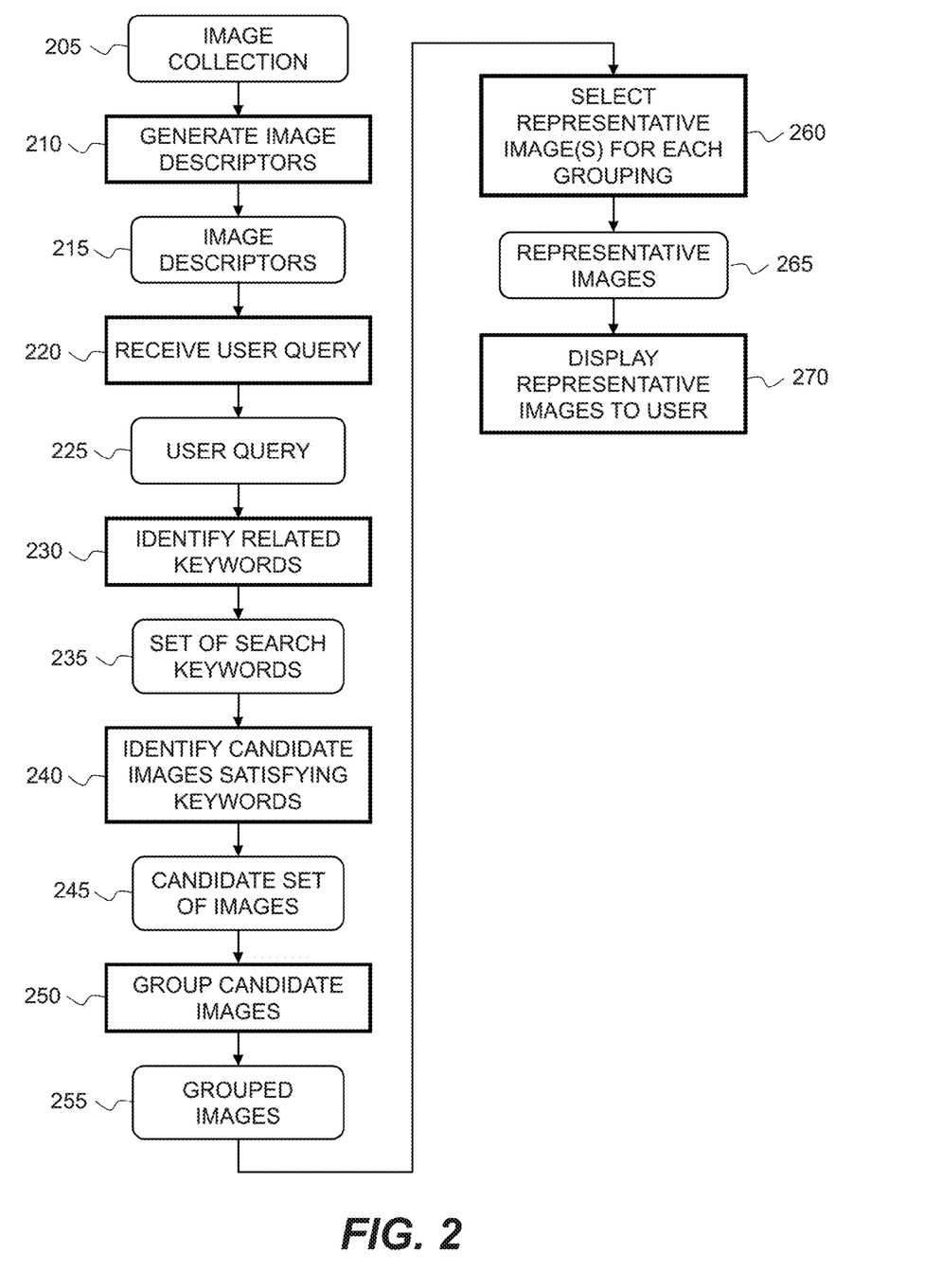
FIG. 2 is a flow diagram illustrating the major steps in receiving and processing media queries according to an embodiment of the present invention.
Figure 3:
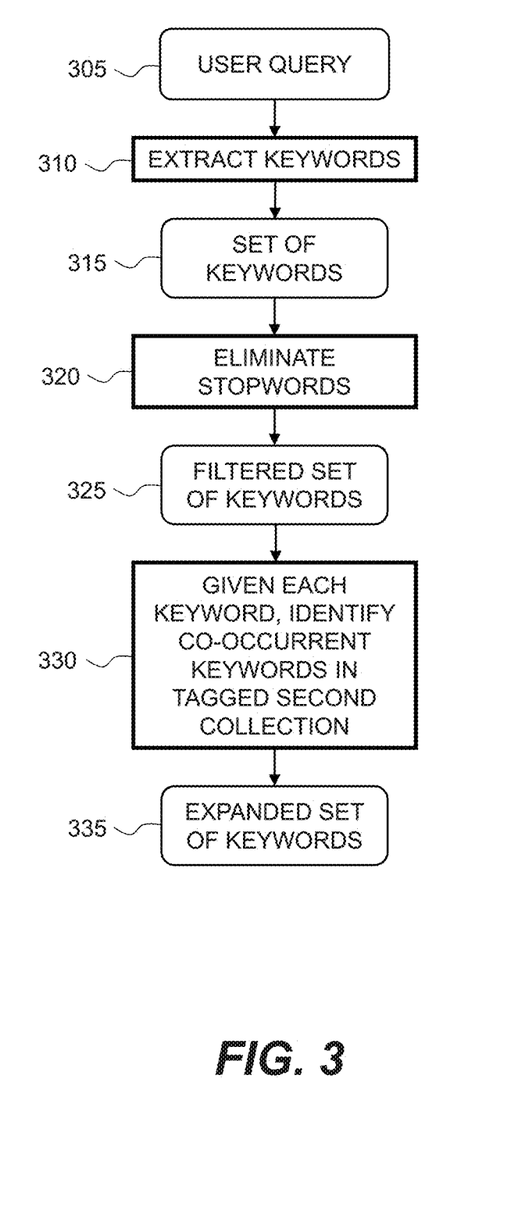
FIG. 3 is a flow diagram illustrating the steps used to transform a user-provided query into a set of keywords that can be used as search terms.
Figure 4:
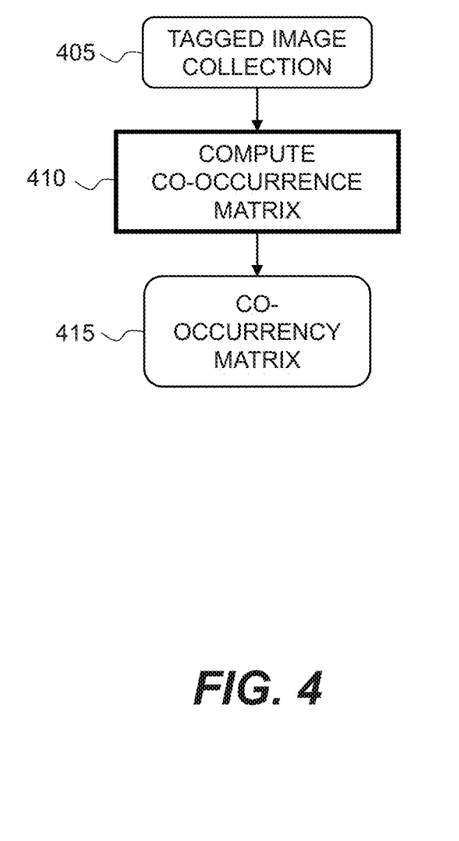
FIG. 4 is a flow diagram illustrating the steps used to compute a co-occurrency matrix.

The data processing system 110 includes one or more data processing devices that implement the processes of the various embodiments of the present invention, including the example processes of FIGS. 2-4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible data storage system 140 includes one or more processor-accessible memories configured to store information, including the information needed to execute the processes of the various embodiments of the present invention, including the example processes of FIGS. 2-4 described herein. In particular, the data storage system 140 includes an image collection 145 and a separate tagged image collection 155. The processor-accessible data storage system 140 can be a distributed processor-accessible data storage system including multiple processor-accessible data storage systems communicatively connected to the data processing system 110 via a plurality of computers or devices. On the other hand, the processor-accessible data storage system 140 need not be a distributed processor-accessible data storage system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible data storage system 140 is shown separately from the data processing system 110, one skilled in the art will appreciate that the processor-accessible data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide images to the data processing system 110. For example, the peripheral system 120 can include digital video cameras, cellular phones, regular digital cameras, or other data processors. The data processing system 110, upon receipt of images from a device in the peripheral system 120, can store such images in the image collection 145 in the processor-accessible data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible data storage system 140 are shown separately in FIG. 1.

FIG. 2 illustrates a method for identifying one or more particular images from an image collection, according to an embodiment of the present invention. This method can be implemented by the data processing system 110 in FIG. 1. The system takes as its input an image collection 205 (equivalently, image collection 145 in FIG. 1) which is indexed in step 210 to produce a set of image descriptors 215. The indexing process includes a variety of indexers, including temporal event clustering on groups of assets as well as temporal indexing based on individual assets; scene, activity, object and material classifiers; face-based age and gender estimators; color; camera capture metadata including, for example, Exif metadata; people recognition and reverse geocoding. These indexers cover the one or more of the usual who, what, when, and where vectors that can be used as the basis for a search for image objects. These indexers can all be implemented by the data processing system 110 in FIG. 1.

Individual images can be indexed based upon their capture date and time. The date and time information can be readily mapped to concepts such as seasons of the year or other temporal periods. In addition, by referring to one or more personal calendars associated with individuals portrayed in the asset or who captured the asset, concepts such as birthday, anniversary or even the names of specific personal events such as "Florida vacation" can be associated with assets. Appropriate civil and religious calendars can be used to further associate the names of holidays such as Christmas or Independence Day with individual assets or event-based clusters. Although the present invention does not require knowledge of such specific events and in fact provides a way to search for such concepts without such tags having been associated with images, it nevertheless can benefit from such tags.

Temporal event clustering of images in the image collection 205 is generated by automatically sorting, segmenting, and clustering an unorganized set of media assets into separate temporal events and sub-events, as described in detail in commonly assigned U.S. Pat. No. 6,606,411 entitled "A method for Automatically Classifying Images Into Events," issued Aug. 12, 2003, and commonly assigned U.S. Pat. No. 6,351,556, entitled "A Method for Automatically Comparing Content of Images for Classification Into Events," issued Feb. 26, 2002. Given the division of images into events, an event classification algorithm can be employed as described in US Patent Application Publication 2010/0124378 entitled "Method for Event-Based Semantic Classification" to classify the event into one of four types: family, vacation, sports or family moment. Other event classification algorithms can be equally applied, resulting in potentially other event types.

Scene classifiers identify or classify an image as representing one or more scene types such as mountain, beach or indoor. Material and texture classifiers identify or classify an image as containing one or more materials or texture types, such as rock, sand, grass, or blue sky. Object classifiers identify or classify an image as containing one or more objects, such as car, cat, or bicycle. Some example scene and material classification types include indoor, outdoor, natural, urban, sunset, beach, foliage, field, mountain, sky, grass, snow, water and sand. Operation of such classifiers are described in U.S. Pat. No. 6,282,317 entitled "Method for automatic determination of main subjects in photographic images"; U.S. Pat. No. 6,697,502 entitled "Image processing method for detecting human figures in a digital image assets"; U.S. Pat. No. 6,504,951 entitled "Method for Detecting Sky in Images"; U.S. Patent Application Publication 2005/0105776 entitled "Method for Semantic Scene Classification Using Camera Metadata and Content-based Cues"; U.S. Patent Application Publication 2005/0105775 entitled "Method of Using Temporal Context for Image Classification"; and U.S. Patent Application Publication 2004/003746 entitled "Method for Detecting Objects in Digital image assets." Research in image understanding algorithms continues to result in new and improved scene, material activity and object classifiers and recognizers, which can easily be incorporated into the invention.

Color classifiers identify or classify an image as containing one or more prominent colors. Such classifiers can compute a histogram of the different colors present in the image, potentially grouping together pixels of nearly identical coloring. The most frequently occurring colors can be mapped to their common color names, which can then be associated with the image as image descriptors.

A face detector algorithm is used to find faces in image collections, and is described in U.S. Pat. No. 7,110,575 entitled "Method for Locating Faces in Digital Color Images", issued Sep. 19, 2006; U.S. Pat. No. 6,940,545 entitled "Face Detecting Camera and Method" issued Sep. 6, 2005; U.S. Patent Application Publication 2004/0179719 entitled "Method and system for face detection in digital image assets" filed Mar. 12, 2003.

Given face detection, the approximate age of an individual can be estimated as described in the work by A. Lanitis, C. Draganova, and C. Christodoulou, "Comparing different classifiers for automatic age estimation," IEEE Transactions on Systems, Man, and Cybernetics, Part B: Cybernetics, vol. 34, no. 1, pp. 621-628, February 2004. Likewise, the gender of a person can be predicted based upon the facial shape as described in the literature. Other cues such as clothing, hair and social context can be further used to improve upon the age and gender estimation, as published in the literature, e.g., the Ph.D. dissertation by Andrew C. Gallagher entitled "A Framework for Using Context to Understand Images of People," published by Carnegie Mellon University, May 2009. Given an estimated age and gender, a high-level semantic label can be associated with the face or the containing image object. For example, given an estimated age of less than one year; the system can generate the label "baby." Given a face estimated to be approximately age 29 and female, the label "woman" can be generated. The presence of multiple faces in an image can further result in additional descriptive labels being generated. For example, the presence of multiple faces estimated to be age 16 or less can result in the label "children." Other labels include "man," "boy," "girl," and "teen." As described in the previously cited dissertation by Andrew C. Gallagher, the presence of multiple faces also can be further used to refine the individual age and gender estimates of each individual in the image. The presence of multiple detected people can be used to tag or label an image as being a group shot; estimates of age and gender of the individuals in the group shot, possibly combined with other contextual cues, can provide additional estimates as to the relative relationships and nature of the group shot, such as a family photo. Such estimates can be used to generate additional semantic labels.

Face recognition is the identification or classification of a face to an example of a person or a label associated with a person based on facial features as described in U.S. Patent Application Publication 2008/0112621 entitled "User interface for face recognition"; U.S. Pat. No. 7,711,145 entitled "Finding Images with Multiple People or Objects"; and U.S. Patent Application Publication 2007/0098303 entitled "Determining a Particular Person from a Collection".

Reverse geocoding is the process of mapping geospatial coordinates such as latitude and longitude to specific place names or geographic feature types. Any of a number of commonly available services for reverse geocoding, such as the service offered by geonames.org, can be employed to perform such mapping. Furthermore, such services can be used to obtain not only nearby feature points, but also geospatial feature types, such as lake, school, beach or park. Heuristics such as those described in the section on geospatial classification in the work by Mark D. Wood entitled "Matching Songs to Events in Image Collections," IEEE International Conference on Semantic Computing, 2009. ICSC '09., pp. 95-102, 14-16 Sep. 2009, can be used to associate one or more feature types with an image.

As noted previously, although the invention is described here in the context of searching for image objects, the technique described herein applies to other media object types. The described invention can also be applied with minor variations to any object type for which one might expect to find an independent set of tagged objects of possibly the same or a different type, where the tags are from a vocabulary that one might use as search terms. One type would be music or audio files. In the case of music objects, the descriptors can include musical genre, artist, album, recording location, and mood. Video is another type; most of the types associated with still image objects also apply to audio. Other types include special sound effects, olfactory recordings or food recipes. Other classifier types can be applicable for other data types and can be used as indexers in addition to or besides the types of classifiers for described here. For example, activity classifiers recognizing activities such as swimming, running, or singing can be employed for video objects.

In addition to descriptors generated algorithmically, the set of descriptors for an image can include descriptors provided directly or indirectly by the user. For example, many users will rename the files corresponding to images of particular importance to them, giving the file a more descriptive name than the name originally used by the capture device. Likewise, users can organize images into folders or directories, giving the directory or folder a meaningful name. In some cases, users will also associate a caption with an image. Information can also be indirectly associated with an image. U.S. Pat. No. 7,025,253 entitled "Agent for integrated annotation and retrieval of images" describes a mechanism for automatically associating suggested annotations with an image.

The following is an example of one embodiment of the descriptors, where the descriptors for a given image object are represented as a distinct XML document.

```
<DOC>
    <docno>urn:guid:fe5ffb3b-b305-4e02-85cd-55f4c4cc9be2</docno>
    <title>C:\DATA\USERS\WOOD\My Pictures\GeoFamily\2002-2005\2005\Florida\100_0438.JPG</title>
    <author>urn:guid:0e9c24e1-0731-4dff-aa8e-802567f3a9f7</author>
    <text>
        <nonprob>
            <path>C:\DATA\USERS\WOOD\My Pictures\GeoFamily\2002-2005\2005\Florida\100_0438.JPG</path>
            <label>Valentine's Day 2005</label>
            <temporal>February 14, 2005 winter afternoon</temporal>
            <subject/>
            <address>Homosassa, Florida, US</address>
            <featureClasses>park spring(s)</featureClasses>
            <nearbyFeatures>Homosassa Springs: spring(s) Homosassa Springs Wildlife State Park: park</nearbyFeatures>
        </nonprob>
        <prob>
            <type>Sports</type>
            <topType>Vacation</topType>
            <scenes>rock sand grass water sky outdoor </scenes>
            <colors>gray gray green blue </colors>
        </prob>
    </text>
</DOC>
```

Numerous alternative representations can be used, both apart from and within the image object. Mechanisms for storing the descriptors within the image object can be used for container-style file formats, such as Exif or MOV files. Some image descriptors have definitions as part of standardized formats such as Exif. Other descriptors can be incorporated into an existing image file format using extension mechanisms. One popular way to include metadata within documents is to use the Extensible Metadata Platform (XMP). Generated metadata can also be stored directly in a database.

Probabilities or numeric scores can also be stored with the metadata properties. For example, the XML elements scenes and colors shown above might in one embodiment include numeric data representing the degree of belief, confidence, probability, or some other numeric score, as illustrated here:
  <scenes>rock 0.11014811 sand 0.12858073 grass 0.10345459 water 0.56204224 sky 0.44345093 outdoor 0.873681</scenes>
  <colors>gray 0.193939 green 0.0938212 blue 0.460917</colors>

Alternatively, other mechanisms can be used to represent different levels of confidence or probability, including discrete categories such as high, medium and low. Again such values can be represented in any of a number of ways familiar to those practiced in software engineering.

Referring back to FIG. 2, in step 220, the system receives a query 225 from the user. This query 225 can be entered by the user using the user interface system 130 of FIG. 1 and can be entered using any of a variety of mechanisms, including the user typing the query 225 into a dialog box, speaking the query into a microphone, or indicating the query by selecting items from a checklist. In one embodiment, the query 225 is expressed as a set of keywords, such as "camping Adirondacks." However, in other embodiments, the user can enter the query 225 as a phrase or sentence in either an imperative or descriptive form, such as, "find pictures of my camping trip in the Adirondacks" or "Michelle's pet rabbit." The query 225 is processed in step 230 by the data processing system 110 of FIG. 1 to produce a set of keywords 235 to use as search terms.

The mechanics of step 230 are shown in FIG. 3, which illustrates the steps used to transform a user-provided query 305 into a set of keywords 335 that can be used as search terms. In step 310, the set of keywords 315 are extracted from the user-provided query 305. If the user provided a phrase or sentence, commonly practiced natural language processing techniques are applied to extract keywords. If the user input is already in the form of a string of keywords, then the string must simply be parsed into a set of keywords 315. Either way, the resulting set of keywords 315 is further processed in step 320 to eliminate any stop words or commonly used terms such as "picture," producing a filtered set of keywords 325. Depending on the system, stopwords can also be partially or completely eliminated as part of step 310, especially if natural language processing techniques are applied to extract keywords 315 from natural language phrases. The filtered set of keywords 325 can then be expanded in step 330.

The expansion process 330 operates by considering each keyword 325, and determining what other keywords 325 are most likely to co-occur with that keyword 325 in the tagged second collection, to produce an expanded set of keywords 335 (equivalently, set of search keywords 235 from FIG. 2). Given a suitable tagged image collection 155 from FIG. 1, the computation of co-occurrent keywords can be computed by one skilled in the art. FIG. 4 illustrates the process of computing a co-occurrency matrix. A tagged image collection 405 (equivalently, 155 from FIG. 1) is processed by step 410 to compute a co-occurrency matrix 415.

The following pseudocode illustrates one algorithm implementing Step 410 for computing the co-occurrency matrix 415 of FIG. 4. In this pseudocode, the co-occurrency matrix 415 is denoted by the variable Cooccurs. Upon completion of the algorithm, the value Cooccurs[a,b] is the frequency of times tag b co-occurs with tag a. In addition, this algorithm illustrates in lines 7 and 8 the optional steps used by some embodiments to maintain a dictionary of all terms known by the system, and the set of categories associated with each term. For a given tag t occurring in image Img, the Category(t) of the tag can be determined based upon the semantic classifier that generated the tag. For example, in FIG. 3, the various XML element names such as colors, scenes and temporal can denote the corresponding categories. A given tag can potentially be generated by multiple classifiers, and therefore have multiple associated categories.

1. Let S = the set of Tagged Images
2. For each image i in S do
3.    Let T = the set of tags associated with image i
4.    For each t in T do
5.       For each t' in T do
6.          Increment CooccursCounts [t, t']
7.          If t' is not in Dictionary, add t' to Dictionary
8.          If Category(t') is not in the list of categories associated with t' in
             Dictionary, add Category(t') to the set of categories for t'
9. For each tag r do
10.    For each tag t do
11.       Set Cooccurs[t,r] = CooccursCounts[t,r] / CooccursCounts[t,t]

Those skilled in the art will recognize that these values or functionally similar values can be computed in alternative ways. Likewise, alternative formulations can result in different definitions for co-occurrence, although still providing data useful for estimating the likelihood two tags or concepts are likely to co-occur.

Figure 5:
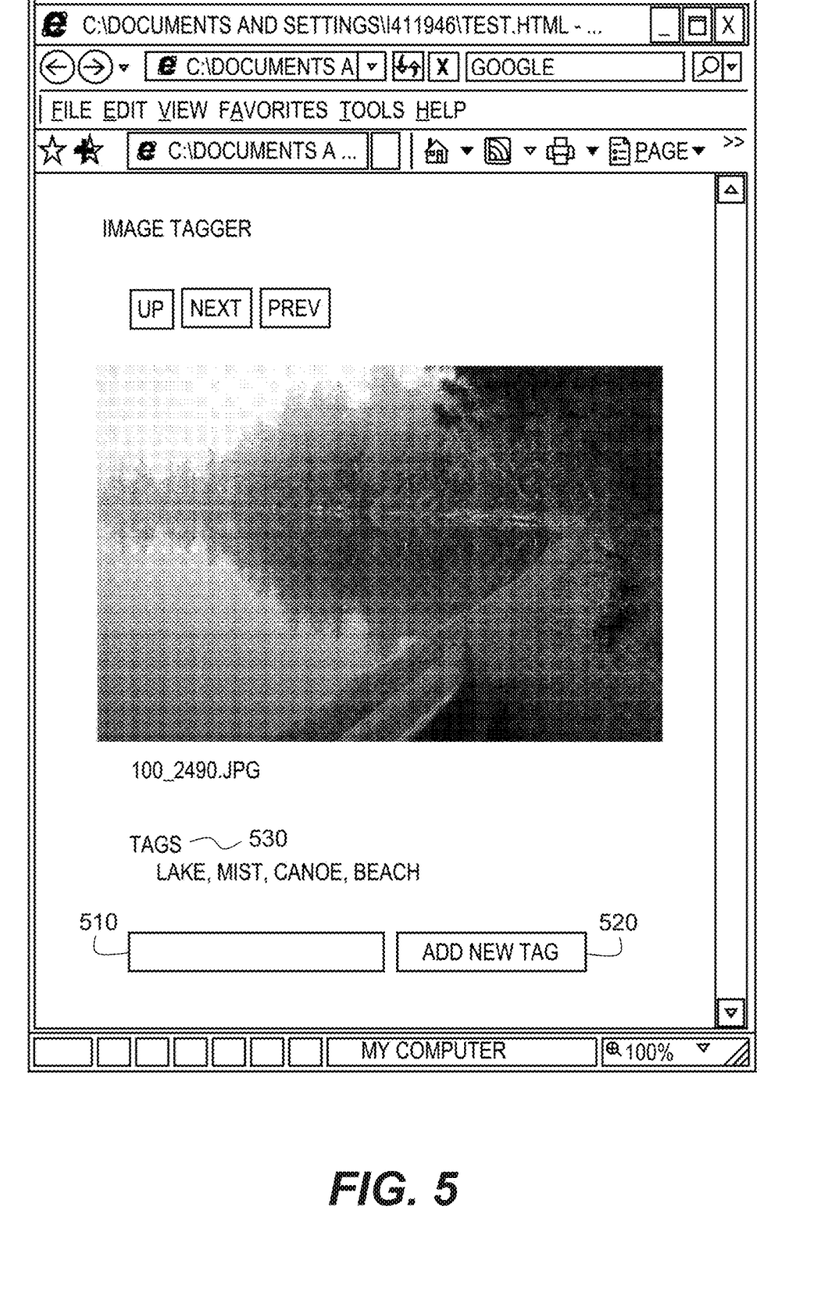
FIG. 5 illustrates an example user interface which can be used to manually tag images as part of creating a tagged image collection.

FIG. 5 illustrates a simple user interface for tagging pictures. The user can enter a new tag into text box 510 and then click on button 520 labeled "Add new tag" to add the tag to the image. The list of tags currently associated with the image is shown in area 530. The tagging application can be part of a desktop application, or it can be offered as part of some on-line photo sharing service such as Flickr, Photobucket, or the Kodak Gallery. Similar services such as Vimeo and YouTube provide tagging functionality for videos. The tagging system can be completely manual; alternatively, it can recommend or suggest tags to a user. Tags can be recommended by using their likelihood of co-occurrence with tags already associated with an image. Some systems automatically generate tags based upon capture metadata, user-provided information, or other information available to the system. Any of these embodiments enable tag information to be collected over a set of images. The images can all belong to a single user, or they can come from thousands or millions of users. In some embodiments, the tagging system can further differentiate between tags originating from different users or different types of images, enabling different Cooccurs matrices to be computed. For example, the system can compute different Cooccurs matrices for tags originating from different user demographics, where the demographics might include language, age, or geographic region. This permits the system to account for different uses of tags depending upon language, age or geography. In such embodiments, the system in step 330 would pick the Cooccurs matrix most appropriate for the current user.

Given the Cooccurs matrix, the step 330 can be carried out using the following procedure:

For each keyword k in the set of filtered keywords 325
Let Cooccurs(k) be the set of all keywords k' such that Cooccurs(k, k') is greater than some threshold t The set Cooccurs(k) is the set of co-occurrent keywords computed by step 330. In some embodiments, the set of co-occurrent keywords can be further filtered, to ensure that the computed keywords are mutually consistent with other search terms provided by the user. This check for consistency is carried out by a modified Step 330, as follows:

For each keyword k in the set of filtered keywords 325
Let Cooccurs(k) be the set of all keywords k' such that Cooccurs(k, k') is greater than some threshold t and for each keyword k" in the set of filtered keywords, k"≠k,
Cooccurs(k', k") is greater than some threshold t'

For example, suppose the co-occurrence frequency for the terms sky, beach, clouds, architecture, London, snow and vacation is as follows:

|  | sky | beach | clouds | architecture | London | snow | vacation |
| --- | --- | --- | --- | --- | --- | --- | --- |
| sky | 1.00 | 0.08 | 0.37 | 0.05 | 0.01 | 0.04 | 0.03 |
| beach | 0.12 | 1.00 | 0.09 | 0.01 | 0.00 | 0.01 | 0.04 |
| clouds | 0.58 | 0.10 | 1.00 | 0.04 | 0.01 | 0.04 | 0.05 |
| architecture | 0.09 | 0.01 | 0.04 | 1.00 | 0.04 | 0.01 | 0.05 |
| London | 0.03 | 0.00 | 0.02 | 0.05 | 1.00 | 0.01 | 0.01 |
| snow | 0.09 | 0.01 | 0.06 | 0.02 | 0.01 | 1.00 | 0.17 |
| vacation | 0.16 | 0.13 | 0.15 | 0.15 | 0.03 | 0.34 | 1.00 |

The behavior of the filtering algorithm can be illustrated by applying the above example co-occurrence matrix to the sample query "London vacation," where the threshold t=0.13 and the threshold t' is 0.04. Using the above example data, and taking the keyword vacation, the co-occurrence frequencies for sky, beach, clouds, architecture and snow are all greater than or equal to the threshold t=0.13. In particular, Cooccurs[vacation, sky]=0.16, Cooccurs[vacation, beach]

=0.13, Cooccurs[vacation, clouds]=0.15, Cooccurs[vacation, architecture]=0.15, and Cooccurs[vacation, snow] =0.34. However, only Cooccurs[London, architecture], which equals 0.05 in the example matrix, is greater than threshold t'=0.04, resulting in Cooccurs(vacation) having the value of {vacation, architecture} in the context of the example query "London vacation."

Some embodiments applying filtering can apply it selectively to keywords, depending on the keyword. For example, the filtering step might only be applied to keywords corresponding to semantic concepts returned by image understanding algorithms such as event classification or scene recognition, but not filter keywords corresponding to concepts extracted from an image filename or path, or that were deduced based upon calendar information and the image capture date. By computing the optional category information as described previously as part of Step 410, some embodiments of Step 330 can incorporate a lookup operation to determine the category of a keyword, either provided as an original search term or obtained from a prior expansion, and adjust the filtering behavior accordingly. By selectively filtering the categories where the expansion is believed to be most "noisy," the performance of the system can be improved, both in the quality of the results and the required computation time.

The expansion process 330 uses a single co-occurrence matrix to carry out both the expansion and filtering operations; those skilled in the art will readily recognize other improvements that can be readily made. For example, a separate source of information can be used for the filtering operation. This information can take the form of a co-occurrence matrix computed from a third source of tagged information. Another source of information is to consider the co-occurrence of terms in knowledgebases such as Wikipedia, or even general Internet search results. Some embodiments can prefer to incorporate rules for filtering based upon the category.

The expansion process 330 can also be applied iteratively, so that each set of expanded keywords is further expanded using the same algorithm. The iteration can continue a bounded number of times, or until some other constraint is satisfied.

Referring back to FIG. 2, step 230 can also incorporate other mechanisms not shown in FIG. 3 in producing the set of search keywords 235. For example, one technique applied in the query expansion literature is to use a lexical database such as WordNet to identify related words; these related words can be included in the set of expanded search keywords. Other sources of knowledge such as gazetteers, Cyc, or Wikipedia can also be used to provide related concepts, using the term or a derivative word of the term, such as the stemmed word form. Furthermore, step 230 can combine the mechanism illustrated in FIG. 3 with other expansion mechanisms in an interleaved or iterative fashion. The expanded search terms can further have weights associated with each term, indicating the strength of the expected significance of that term. For example, the weights can be proportional to the co-occurrency frequency. In addition, terms whose co-occurrency frequency is sufficiently low can be completely excluded from the set of expanded terms.

In step 240, the search keywords 235 are used to identify a set of candidate images 245. In one embodiment, step 240 is carried out by indexing the image descriptors 215 using an information retrieval system such as the Indri information retrieval system from the University of Massachusetts, which is described in T. Strohman, D. Metzler, H. Turtle, and W. B. Croft, "Indri: A language-model based search engine for complex queries (extended version)," Center for Intelligence Information Retrieval Technical Report, 2005. This information retrieval system supports complex queries including weighted search terms, and quickly returns matching documents. This embodiment assigns different weights to each search term in the expanded list of keywords 335 in FIG. 3, depending on the origin. For example, keywords 335 provided by the user are given a higher weight than terms obtained through the expansion process. The weight for expanded keywords 335 can be further adjusted based upon their frequency of co-occurrence, their category, or how many iterations of the expansion process were required to result in the word being added to the expansion list. Search terms obtained from alternate sources such as WordNet can have separate weights, with the weight based upon the expanded term's relationship to the term being expanded. For example synonyms can be assigned a higher weight than hypernyms and hyponyms.

Using the image descriptors 215 as the indexed documents, Indri will identify which documents satisfy the specified search terms expressed as an Indri query. By incorporating into each document a reference to the original image, the results from Indri can be easily mapped to the actual image objects. Of course, one skilled in the art will recognize that a search system also can be more directly implemented, including one that accommodates the storage of the image descriptors directly within the image objects. Indri combines the inference network model of information retrieval with a language model for estimating the probability that a given term is satisfied by a given document. However other models known to those skilled in the art of information retrieval can also be applied in step 240 to determine which candidate images satisfy the search keywords.

Step 240 produces the set of candidate images 245, which in some embodiments are ranked or ordered according to the estimated strength of their match. In step 250, the candidate images are grouped to produce sets of grouped images 255. The grouping process is based on some commonality in the candidate images with respect to one or more of the image descriptors. For example, in some embodiments, images are grouped by event, so that all images which were taken as part of the same event, using the previously mentioned temporal event clustering algorithm to determine event boundaries. In other embodiments, images can be grouped based upon location, based upon the people identified in the image, based upon visual similarity, or based upon scene, material or activity similarity. The user can have the ability to determine the mode of grouping the candidate images, or the system can automatically chose an appropriate grouping method by analyzing the images.

In Step 260, a representative image is selected from each candidate grouping to produce a set of representative images 265. The representative image 265 can be selected using any of a variety of algorithms. For example, the representative image 265 can be the image from the group that scored the highest according to the search criteria. The representative image 265 can also be selected according to some other scoring function partially or completely independent of the search ranking. For example, the images in a group can be ranked according to their expected aesthetic appeal or information content. Alternatively, the representative image 265 for a grouping can be a new image, formed by compositing a plurality of the images in the candidate group.

In Step 270, the set of representative images is displayed to the user. These images can be displayed using the user interface system 130 of FIG. 1. The user interface system 130 can further provide the user with a variety of choices for controlling the display. For example, the user can elect to have all results displayed, not just the representative images 265 chosen in step 260. Or the user can request that a different mechanism be used to pick the representative images 265, resulting in Step 260 being repeated using the user's specified criteria for selecting representative images 265.

Figure 6:
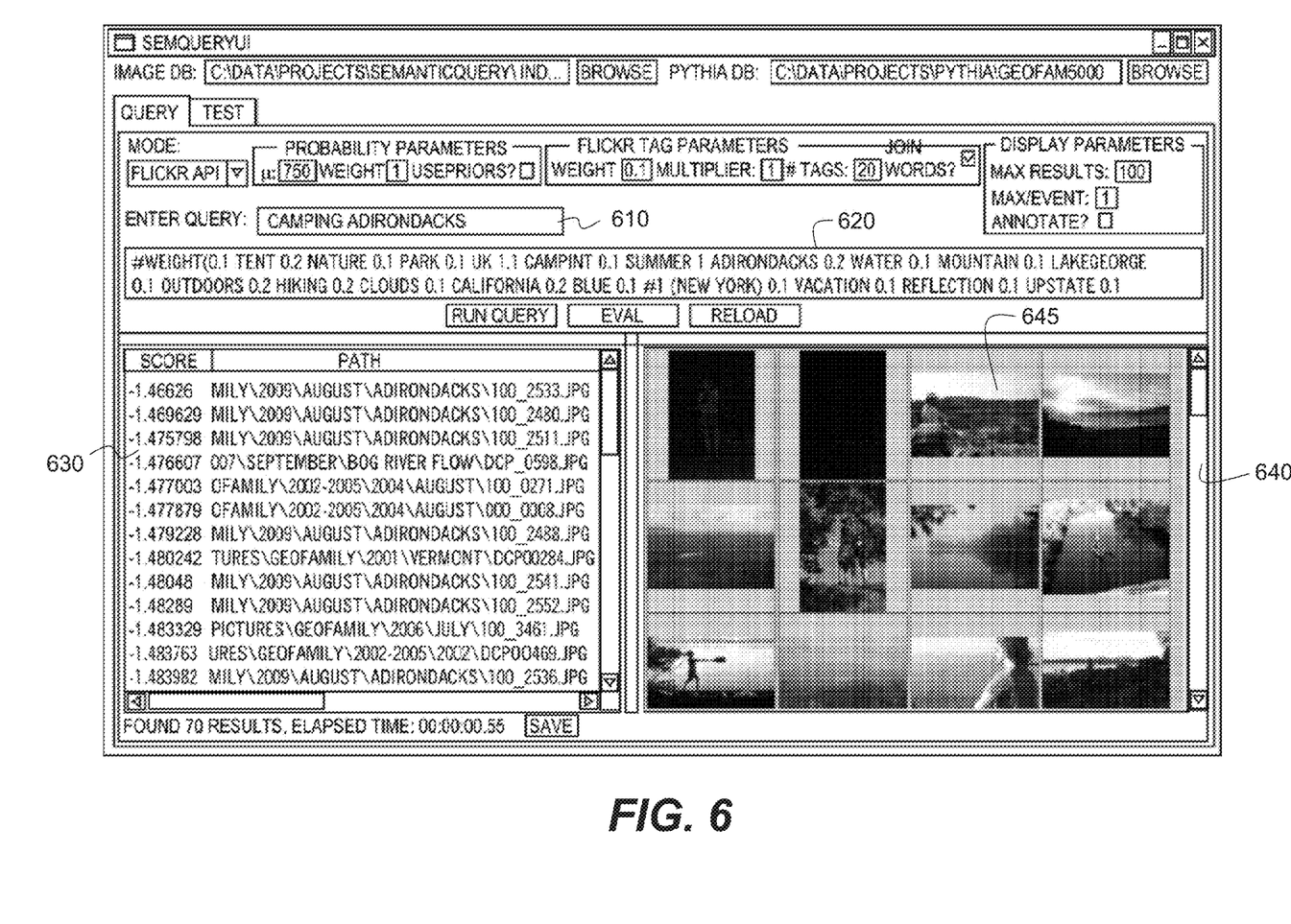
FIG. 6 illustrates an example user interface for searching an image collection.

FIG. 6 illustrates one embodiment for the user interface. In query text box 610, the user entered the search terms "camping Adirondacks." The system displayed the resulting representative images 265 in a scrollable region 640, with the corresponding image pathnames and search score shown in scrollable area 630. In area 620, the user can see the actual query that was formed from the set of expanded search terms. Providing the user with the ability to see the query formed from the search term permits the sophisticated user the ability to further refine the search terms. Some embodiments can prefer to show the user the list of expanded search terms using an alternative user interface, perhaps in the form of checkboxes, permitting the user to deselect any inappropriate search terms. However, some embodiments would conceal that level of complexity from the average user.

Figure 7:
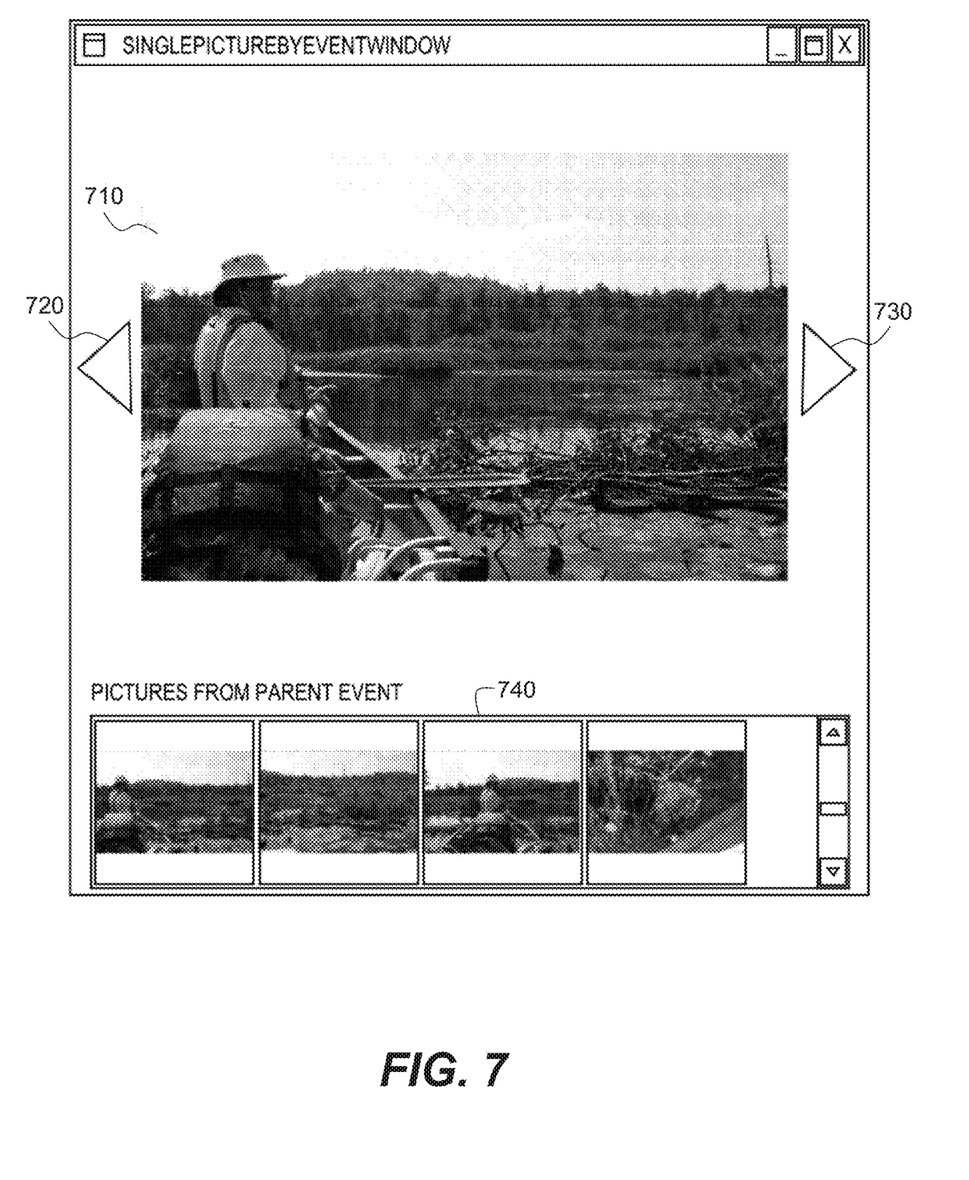
FIG. 7 illustrates an example user interface for viewing and navigating a group of search results.

In the user interface illustrated in FIG. 6, the user can click on an image shown in scrollable region 640 to see other images from the same candidate grouping. For example, the user can click on image 645 to see other images in the same event, as illustrated in FIG. 7. FIG. 7 illustrates the use of a film strip view 740, where the user can click on a given image and see it displayed at a larger resolution in area 710; the user can also navigate forward and backwards in a grouping-appropriate manner, such as by chronological order, using a previous button 720 and a forward button 730.

In some embodiments, the user can have the ability to confirm the appropriateness of a returned result, and the system can then automatically incorporate the user-provided search terms into the corresponding image descriptor; it can also incorporate a subset of the search terms, according to their category, into the image descriptors for other images related to that image, such as images from the same event or place. Such tags can also be directly added into the image metadata embedded within the image file itself. Furthermore, some embodiments of this invention can apply the concept expansion step directly to each image's descriptors to generate additional candidate concepts to apply to each image, apart from and without requiring the user to perform a search operation. Such concepts can be presented to the user as suggested tags or annotations, or otherwise be used to facilitate navigation and browsing the image collection.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents.

PARTS LIST 110 data processing system
120 peripheral system
130 user interface system
140 data storage system
145 image collection
155 tagged image collection
205 image collection
210 step
215 image descriptors
220 step
225 query
230 step
235 search keywords
240 step
245 candidate images
250 step
255 grouped images
260 step
265 representative images
270 step
305 user provided query
310 step
315 extracted keywords
320 step
325 filtered keywords
330 step
335 expanded set of keywords
405 tagged image collection
410 step
415 co-occurrency matrix
510 text box
520 button
530 area
610 query text box
620 area
640 scrollable region
645 image
710 area
720 previous button
730 forward button

The invention claimed is:

1. A method of identifying one or more particular media objects from a collection, comprising using a data processing system for:
   (a) indexing the collection to provide descriptors for each media object in the collection such that each media object is described by one or more of the descriptors;
   (b) receiving a query from a user specifying at least one keyword for a media object search, wherein the at least one keyword is not an image descriptor;
   (c) using the keyword(s) to search a second collection of tagged media objects to identify co-occurrence keywords;
   (d) using the identified co-occurrence keywords to provide an expanded list of keywords;
   (e) using the expanded list of keywords to search the descriptors to identify a set of candidate media objects satisfying the keywords;
   (f) grouping the set of candidate media objects according to at least one of the descriptors, and selecting one or more representative media objects from each grouping; and
   (g) displaying the representative media objects to the user.

2. The method of claim 1 wherein the media object comprises a music or audio file.

3. The method of claim 2 wherein the descriptor comprises a musical genre, artist, album, recording location, or mood.

4. The method of claim 1 wherein the media object comprises a video file.

5. The method of claim 4 wherein the video file comprises an activity classifier.

6. The method of claim 5 wherein the activity classifier comprises swimming, running, or singing.

7. The method of claim 1 wherein the media object comprises a sound effect file.

8. The method of claim 1 wherein the media object comprises a food recipe file.

9. The method of claim 1 wherein grouping the set of candidate media objects is determined by the user.

10. The method of claim 1 wherein grouping the set of candidate media objects is performed automatically by the system.

11. The method of claim 1 further comprising manually tagging the media objects.

12. The method of claim 1 wherein the system recommends tags for the media objects.

13. The method of claim 1 wherein the media objects are tagged using user demographics.

14. The method of claim 13 wherein the user demographics comprise language, age, or geographic region.

15. The method of claim 1 wherein the media object comprises an olfactory recording.

* * * * *